Patented Oct. 13, 1925.

1,556,968

UNITED STATES PATENT OFFICE.

JOSEPH A. SMITH, OF HORNELL, NEW YORK.

FLUX.

No Drawing.   Application filed May 14, 1925. Serial No. 30,359.

*To all whom it may concern:*

Be it known that I, JOSEPH A. SMITH, a citizen of the United States, residing at Hornell, in the county of Steuben and State of New York, have invented certain new and useful Improvements in Fluxes, of which the following is a specification.

This invention relates to improvements in compounds for welding gray cast iron and more particularly to a novel and improved compound particularly adapted for the electric arc welding art process.

One of the objects of my invention is to produce a flux, consisting of ingredients particularly adapted for welding cast iron, whereby a good, tough and sound weld is produced wherein good penetration and rapid deposition of the metal occurs and wherein the cost of operation is reduced to a minimum.

Another object of my invention is to produce a compound or flux for welding cast iron possessing the following ingredients, namely, borax, powdered carbon, graphite, silicon, calcium phosphate, superphosphate and phosphoric acid.

It is well known that borax or sodium tetraborate is used in fluxes for making welds in that it has the property of holding the other ingredients of the compound together when fused or melted. I utilize powdered carbon since it is a good conductor of electricity, and produces a steady and regular arc. Graphite is soluble in melted iron from which it crystallizes on cooling. Silicon, which melts at a temperature above the melting point of iron is utilized so as to make the weld softer whereby the same may be machined and this ingredient also prevents formation of bubbles or air holes. Calcium phosphate which is a precipitate of a solution of a calcium salt by the sodium phosphate is access, is used because it has the property of producing a sounder and proper weld and eliminates the pores, which otherwise weakens the weld. Superphosphate or superphosphate of calcium, being a mixture of tetrahydrogen calcium phosphate and calcium sulphate possesses the property of producing a better penetration in the parts of the metal to be welded. Phosphoric acid being a somewhat syrupy liquid, constitutes one of the ingredients of my compound, since when the welding wire is dipped in the phosphoric acid, it forms a binder for the adhesion of the other elements heretofore described. When heated to a high temperature, the phosphoric acid crystallizes and combines with the other ingredients which are free from air holes or bubbles.

In actual practice, I have found that a flux consisting of the following ingredients in the proportions and quantities named is the most desirable for welding gray cast iron by the electric arc process. While the quantities of the ingredients may be slightly varied, I have found that the best results are produced by a compound consisting of borax 4 pounds, powdered carbon 14 ounces, graphite 1 pound, silicon ¼ of a pound, calcium phosphate ½ pound and superphosphate 1 pound. The welding wire, however, is first dipped in the phosphoric acid and then the adhesion of the carbon, graphite, borax, silicon, calcium phosphate and superphosphate permits of the welding of the gray cast iron as the electric arc is applied.

Having shown and described my invention, what I claim as new and desire to secure by United States Letters Patents is:—

1. The herein described flux consisting of borax, powdered carbon, graphite, silicon, calcium phosphate, and superphosphate.

2. The herein described flux consisting of borax, powdered carbon, graphite, silicon, calcium phosphate, superphosphate and a binder which crystallizes at a high temperature.

3. The herein described flux consisting of borax, powdered carbon, graphite, silicon, calcium phosphate, superphosphate and phorphoric acid.

4. The herein described flux consisting of a composition consisting of borax, four pounds; fourteen ounces of powdered carbon, one pound of graphite, one-quarter of a pound of silicon, one-half pound of calcium phosphate and one pound of superphosphate.

In testimony whereof I affix my signature.

JOSEPH A. SMITH. [L. S.]